United States Patent
Chen et al.

(10) Patent No.: US 11,448,498 B2
(45) Date of Patent: Sep. 20, 2022

(54) THREE-DIMENSIONAL RECONSTRUCTION SYSTEM AND THREE-DIMENSIONAL RECONSTRUCTION METHOD

(71) Applicant: SKYVERSE TECHNOLOGY CO., LTD, Shenzhen (CN)

(72) Inventors: Lu Chen, Shenzhen (CN); Qinggele Li, Shenzhen (CN); Song Zhang, Shenzhen (CN); Su Lv, Shenzhen (CN); Zike Han, Shenzhen (CN)

(73) Assignee: SKYVERSE LIMITED, Shenzhen (CN)

( * ) Notice: Subject to any disclaimer, the term of this patent is extended or adjusted under 35 U.S.C. 154(b) by 101 days.

(21) Appl. No.: 16/962,928

(22) PCT Filed: Mar. 27, 2018

(86) PCT No.: PCT/CN2018/080661
§ 371 (c)(1),
(2) Date: Jul. 17, 2020

(87) PCT Pub. No.: WO2019/140778
PCT Pub. Date: Jul. 25, 2019

(65) Prior Publication Data
US 2021/0131795 A1  May 6, 2021

(30) Foreign Application Priority Data
Jan. 17, 2018  (CN) .......................... 201810045501.X

(51) Int. Cl.
*G01B 11/24* (2006.01)
*G06T 17/00* (2006.01)

(52) U.S. Cl.
CPC .............. *G01B 11/24* (2013.01); *G06T 17/00* (2013.01)

(58) Field of Classification Search
CPC ..... G01B 11/24; G01B 2210/50; G06T 17/00; A61B 2090/0445; A61B 2090/0472;
(Continued)

(56) References Cited

U.S. PATENT DOCUMENTS 6,275,287 B1 * 8/2001 Watanabe .......... G01N 21/9036
356/239.4
2006/0090361 A1 * 5/2006 Matsuda ................ G01B 11/24
33/503

(Continued)

FOREIGN PATENT DOCUMENTS

CN    101872064 A    10/2010
CN    104200514 A    12/2014
(Continued)

*Primary Examiner* — Tri T Ton
(74) *Attorney, Agent, or Firm* — Robert L. Stearns; Dickinson Wright, PLLC

(57) ABSTRACT

A three-dimensional reconstruction system and a three-dimensional reconstruction method, the system includes: a carrier device which includes a rotatable support and a carrier arranged on the rotatable support, the rotatable support is provided with a rotational axis; a data acquisition device spaced apart from the carrier and configured to collect reflective light data of an object on the carrier when the rotatable support rotates to a corresponding angle and to obtain single-visual-angle data of the object at the corresponding angle; and a data processing device connected with the data acquisition device and configured to perform three-dimensional reconstruction according to the single-visual-angle data and a reconstruction algorithm.

17 Claims, 4 Drawing Sheets

(58) Field of Classification Search
CPC .. A61B 90/04; A61C 5/90; A61N 2007/0034;
A61N 7/00; H01L 27/14603; H01L
27/14609; H01L 27/14627; H01L 27/307;
H04N 5/2257; H04N 5/232411; H04N
5/23245; H04N 5/343; H04N 5/363;
H04N 5/3741; H04N 5/3745; H04N
5/378; H04N 5/379
USPC ..... 356/600–640, 239.1–239.8, 237.1–237.6
See application file for complete search history.

(56) References Cited

U.S. PATENT DOCUMENTS

| | | | |
|---|---|---|---|
| 2014/0111812 A1* | 4/2014 | Baeg | G01S 7/4814 |
| | | | 356/610 |
| 2017/0168142 A1* | 6/2017 | Kumagai | G01S 17/66 |
| 2018/0156595 A1* | 6/2018 | Kay | G01B 9/0205 |

FOREIGN PATENT DOCUMENTS

| | | |
|---|---|---|
| CN | 105547188 A | 5/2016 |
| CN | 105698713 A | 6/2016 |
| CN | 105758343 A | 7/2016 |
| CN | 106683187 A | 5/2017 |
| CN | 106683188 A | 5/2017 |
| CN | 106767514 A | 5/2017 |
| CN | 106875468 A | 6/2017 |
| CN | 107121090 A | 9/2017 |
| CN | 107388985 A | 11/2017 |
| JP | H07174537 A | 7/1995 |
| JP | 2005514606 A | 5/2005 |
| JP | 2008032449 A | 2/2008 |
| JP | 2014035266 A | 2/2014 |
| JP | 2016136091 A | 7/2016 |
| JP | 2016223928 A | 12/2016 |

* cited by examiner

THREE-DIMENSIONAL RECONSTRUCTION SYSTEM AND THREE-DIMENSIONAL RECONSTRUCTION METHOD

CROSS-REFERENCE TO RELATED APPLICATION

The present application is a 35 U.S.C. § 371 national stage application of PCT Application Ser. No. PCT/CN2018/080661, filed on Mar. 27, 2019, which claims priority to Chinese Patent Application Ser. No. CN201810045501.X, filed on Jan. 17, 2018, the entire contents of which are incorporated herein by reference in their entireties.

TECHNICAL FIELD

The present disclosure relates to the technical field of three-dimensional imaging, and particularly to a three-dimensional reconstruction system and a three-dimensional reconstruction method.

BACKGROUND

Three-dimensional reestablishment (also referred to as "three-dimensional reconstruction") refers to a key technique that utilizes data point cloud to depict shape distribution of a three-dimensional object and establishes a virtual reality expressing objective world in a computer. The early three-dimensional reconstruction technology is mainly used for the measurement of large objects (e.g., buildings, automobiles, etc.), with the development of modern technology and manufacturing process, the three-dimensional reconstruction technology is applied in more and more industries, for example, in small object precision machining industry, the effect of key process and the quality of finished product are monitored through three-dimensional reconstruction, so that the production cost is reduced and the yield is improved. A new requirement for three-dimensional reconstruction is proposed under this application background, firstly, the detection speed is fast, people hopes that as many objects as possible may be detected in unit time; secondly, the calculation amount of the algorithm is small, the purpose is difficult to be realized using complex three-dimensional reconstruction due to the fact that the number of objects to be detected is great, and on-line detection is generally performed; furthermore, the detection precision is high, the machining precision is a critical parameter of precision machining, and processing effect detection also has higher requirement on precision.

The existing three-dimensional reconstruction technology mainly includes a contact detection and a non-contact detection, where the contact detection is mainly used for using a probe to scan an object surface and acquiring a three-dimensional morphology. The method is high in cost, takes much time, and is prone to cause surface damage, this method may only be used for sampling detection, and is unsuitable for quality monitoring; non-contact detection is mainly achieved by optical methods including co-focusing, laser scanning, focusing morphology recovery, white light interference, etc. These optical methods have the advantages including lossless, rapidness, low cost, etc., which are beneficial for on-line quality monitoring of the product. However, the existing optical detection methods still fail to meet the requirement of detection speed of effect monitoring of many precision machining processes, thus, applications of these optical detection methods are constrained.

Technical Problem

The purpose of the present disclosure is providing a three-dimensional reconstruction system and a three-dimensional reconstruction method which aims at solving a technical problem that the conventional three-dimensional optical reconstruction method is slow in detection speed.

Technical Solution

In order to solve the aforesaid technical problem, the technical solutions adopted by the embodiments of the present disclosure are as follows:

in one aspect, the present disclosure is implemented in this way, a three-dimensional reconstruction system, including:

a carrier device which includes a rotatable support and a carrier arranged on the rotatable support, the rotatable support comprises a rotational axis;

a data acquisition device spaced apart from the carrier and configured to collect reflective light data of an object on the carrier when the rotatable support rotates to a corresponding angle so as to obtain single-visual-angle data of the object at the corresponding angle; and a data processing device connected with the data acquisition device and configured to perform three-dimensional reconstruction according to the single-visual-angle data and a reconstruction algorithm.

Furthermore, the data acquisition device is a chromatic dispersion confocal data acquisition device, and the collected reflective light data is reflection spectrum data.

Furthermore, the three-dimensional reconstruction system further includes a rotational axis correction surface, the data acquisition device is further configured to collect reflection signals of the rotational axis correction surface so as to obtain reflection data, and the data processing device is further configured to calculate a rotational axis position according to the reflection data and correct the reconstruction algorithm according to the rotational axis position.

Furthermore, the rotational axis correction surface is arranged on the carrier.

Furthermore, the rotational axis correction surface is a diffuse reflection surface.

Furthermore, an initial direction of the rotational axis is perpendicular to an optical path for collection of the data acquisition device.

Furthermore, the carrier device further includes a horizontal translation carrier, the data acquisition device includes a vertical lifting platform and a camera arranged on the vertical lifting platform;

the rotatable support is arranged on the horizontal translation carrier;

the data acquisition device is arranged on the vertical lifting platform to enable a height of the data acquisition device relative to the carrier to be adjustable;

an initial direction of the rotational axis is parallel to the horizontal translation carrier;

an optical path for collection of the data acquisition device is perpendicular to the horizontal translation carrier.

Furthermore, the camera at least includes a broad-spectrum light source, a chromatic dispersion lens and a detector, the broad-spectrum light source, the chromatic dispersion lens and the detector are configured to obtain the single-visual-angle data based on a chromatic dispersion confocal method; the data processing device performs the three-dimensional reconstruction according to the single-visualangle data of different viewing angles and a conversion matrix of different viewing angles.

In a second aspect, a three-dimensional reconstruction method performed based on the aforesaid three-dimensional reconstruction system, including following steps of:

S1, driving the rotatable support to rotate so as to drive an object on the carrier to rotate;

S2, collecting reflective light data to obtain single-visual-angle data by the data acquisition device when the object rotates to a corresponding angle; and S3, performing three-dimensional reconstruction by the data processing device according to the single-visual-angle data of different angles and the reconstruction algorithm.

10. The three-dimensional reconstruction method according to claim 9, wherein the step S2 specifically comprises:

irradiating the object with a broad-spectrum light source and collecting single-visual-angle data of the object at different viewing angles based on a chromatic dispersion confocal method.

Furthermore, the chromatic dispersion confocal method at least includes following steps:

irradiating broad-spectrum light beam through a broad-spectrum light source and generating linear-shaped detection light;

projecting the detection light on a surface of the object through a chromatic dispersion lens;

moving the object horizontally to complete a surface scanning of the object; and collecting reflective light data of the detection light which penetrates through the object and is reflected by the object by a detector, and processing the reflective light data to obtain the single-visual-angle data.

Furthermore, the step S3 specifically includes: applying single-visual-angle data of different viewing angles to preset conversion matrixes of corresponding viewing angles and performing three-dimensional data point cloud registration to obtain a three-dimensional reconstructed image through the data processing device.

Furthermore, a step S0 of measuring the rotational axis position of the rotatable support and correcting the reconstruction algorithm according to measurement data of the rotational axis position is included before the step S1.

Furthermore, the step S0 includes:

arranging a rotational axis correction surface in a three-dimensional measurement system;

rotating the rotational axis on the rotatable support by a first angle and by a second angle successively based on its current position, and obtaining initial position data of the rotational axis correction surface without rotation, first angular data of the rotational axis correction surface at a first angle, and second angular data of the rotational axis correction surface at a second angle in an initial coordinate system of the system;

calculating the rotational axis position according to the first angular data, the second angular data and the initial position data; and incorporating the rotational axis position into an uncorrected reconstruction algorithm to generate a corrected reconstruction algorithm.

Furthermore, the step of calculating the rotational axis position according to the first angular data, the second angular data and the initial position data specifically includes:

calculating a first angular bisector plane of an initial plane and a first plane, calculating a second angular bisector plane of an initial plane and a second plane, where the initial plane corresponds to the initial position data, the first plane corresponds to the first angular data, the second plane corresponds to the second angular data; determining an intersection line of the first angular bisector plane and the second angular bisector plane as the rotational axis position.

Furthermore, the first angle and the second angle are identical in angular dimension and are opposite in direction in the step S0.

Furthermore, the rotational axis correction surface is a diffuse reflection surface.

Furthermore, both the first angle and the second angle are greater than 15 degrees, and the step S0 is performed in the event that an angular deflection of the rotational axis is greater than or equal to a preset angular deflection.

Advantageous Effects

The three-dimensional reconstruction system and the three-dimensional reconstruction method provided by the embodiment of the present disclosure have the following technical effects: the three-dimensional reconstruction system adopts a rotatable support to hold up an object, the data acquisition device is adopted to collect reflective light data of the object, when measuring single-visual-angle data of the object at different viewing angles, the rotatable support drives the object to rotate, the data acquisition device does not rotate, so that multiple single-visual-angle data is obtained, a three-dimensional data point cloud registration is performed to realize the three-dimensional reconstruction according to the single-visual-angle data and rotation angles. On the basis that the rotatable support itself has relatively high positioning accuracy and optical path deviation is not prone to occur in the rotating process, so that higher measurement precision may be guaranteed; furthermore, the optical path needs not to be frequently corrected, a three-dimensional reconstruction speed is improved, and a detection efficiency of the object is further improved; moreover, the rotation of the rotatable support may not cause a change in system space, so that miniaturization of the reconstruction system is facilitated. In comparison, the conventional system of moving optical path for collection to change detection viewing angle is prone to generate optical path deviation, and thereby causing low measurement precision; multiple corrections of the optical path causes a reduction in the detection efficiency of the product; moreover, the area required for changing the detection viewing angle is bigger, which goes against the miniaturization of the reconstruction system.

BRIEF DESCRIPTION OF THE DRAWINGS

In order to explain the technical solutions in the embodiments of the present disclosure more clearly, a brief introduction regarding the accompanying drawings that need to be used for describing the embodiments of the present disclosure or the prior art is given below; it is apparent that the accompanying drawings described as follows are merely some embodiments of the present disclosure, the person of ordinary skill in the art may also acquire other drawings according to the current drawings on the premise of paying no creative labor.

DESCRIPTION OF THE EMBODIMENTS

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

It should be noted that, when one component is described to be "fixed to" or "arranged on" another component, this component may be directly or indirectly arranged on another component. When one component is described to be "connected with" another component, it may be directly or indirectly connected to the other component. Orientation or position relationships indicated by terms including "upper", "lower", "left" and "right" are based on the orientation or position relationships shown in the accompanying figures and is only used for the convenience of description, instead of indicating or implying that the indicated device or element must have a specific orientation and is constructed and operated in a particular orientation, and thus should not be interpreted as limitation to the present disclosure. For the person of ordinary skill in the art, the specific meanings of the aforesaid terms may be interpreted according to specific conditions. Terms of "the first" and "the second" are only for the purpose of describing conveniently and should not be interpreted as indicating or implying relative importance or impliedly indicating the number of indicated technical features. "Multiple/a plurality of" means two or more unless there is an additional explicit and specific limitation.

Figure 1:
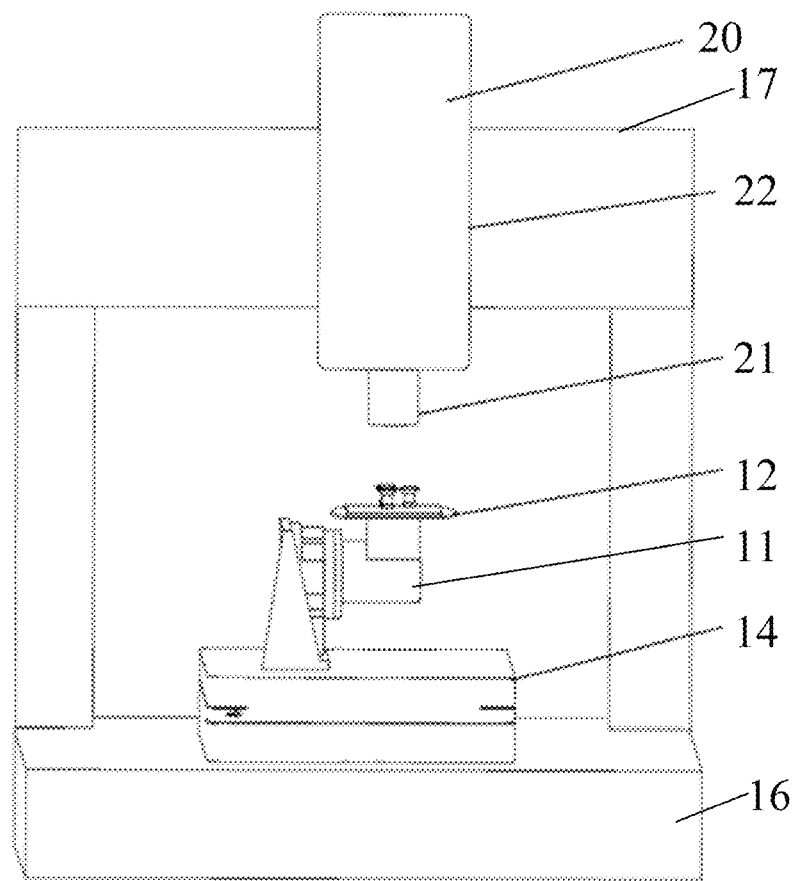
FIG. 1 illustrates a schematic structural diagram of a three-dimensional reconstruction system provided by an embodiment of the present disclosure.
Figure 2:
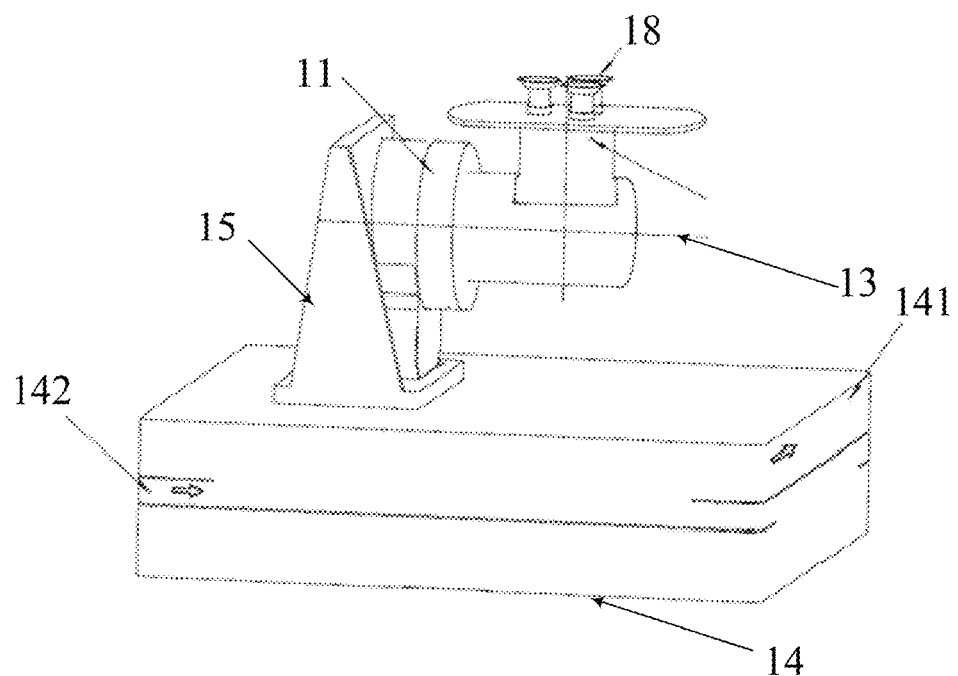
FIG. 2 illustrates a first schematic structural diagram of a carrier device of the three-dimensional reconstruction system provided by an embodiment of the present disclosure.

In order to illustrate the technical solutions of the present disclosure, the present disclosure is described in detail with reference to specific accompanying figures and embodiments below:

Referring to FIG. 1 and FIG. 2, an embodiment of the present disclosure provides a three-dimensional reconstruction system which at least includes a carrier device 10, a data acquisition device 20, and a data processing device 30, where the carrier device 10 includes a rotatable support 11 and a carrier 12 disposed on the rotatable support 11, the rotatable support 11 has a rotational axis 13. Specifically, the rotational axis 13 at least includes a horizontal rotational axis (i.e., X rotational axis or Y rotational axis), and may also include a vertical rotational axis (i.e., Z rotational axis). The data acquisition device 20 is spaced apart from the carrier 12 and does not rotate when the rotatable support 11 rotates, however, the data acquisition device 20 may move horizontally or move upwards and downwards relative to the rotatable support 11 so as to collect, when the rotatable support 11 rotates by a corresponding angle, reflective light data reflected by the object 18 on the carrier 12 and to obtain single-visual-angle data of the object 18 at the corresponding angle; and the data processing device 30 is connected with the data acquisition device 20 for three-dimensional reconstruction according to the single-visual-angle data and the reconstruction algorithm.

Particularly, the rotatable support 11 of the carrier device 10 may rotate based on its rotational axis 13, there is a certain distance between the camera 21 of the data acquisition device 20 and the carrier 12, so that the camera 21 is enabled to collect the reflective light data reflected by the whole surface of the object, the optical path for collection of the camera 21 is preferably perpendicular to the initial direction of the rotational axis 13. The object is driven to rotate through the rotational axis 13, when the object rotates to the corresponding angle, the data acquisition device 20 acquires single-visual-angle data of the object at the corresponding angle, the plurality of single-visual-angle data is transmitted to the data processing device 30 and is processed by the data processing device 30 to obtain the three-dimensional reconstructed image of the object. It may be understood that, the rotation angle of the rotational axis 13 may be predetermined, and a reconstruction algorithm based on angles and single-visual-angle data is preset in the data acquisition device 20. The three-dimensional reconstruction algorithm based on angle and single-visual-angle data may apply the existing correlation algorithms such as reconstruction based on commonly used conversion matrix, and the like.

According to the three-dimensional reconstruction system provided by the embodiment of the present disclosure, the rotatable support 11 is adopted to hold up the object, the data acquisition device 20 is used to collect data, when measuring the single-visual-angle data of the object at different viewing angles, the rotatable support 11 is enabled to drive the object to rotate while the data acquisition device 20 does not rotate, so that multiple single-visual-angle data is obtained, and three-dimensional data point cloud registration is performed according to the single-visual-angle data and the rotation angles to realize three-dimensional reconstruction. On the basis that the rotatable support 11 has relatively high positioning accuracy, and the optical path deviation is not prone to occur in the rotating process, so that higher measurement accuracy may be guaranteed, the optical path needs not to be frequently corrected, the three-dimensional reconstruction speed is improved, and the efficiency of object detection is further improved; moreover, the rotation of the rotatable support 11 does not cause a change in system space, and miniaturization of the reconstruction system is facilitated. In comparison, the conventional system of changing detection viewing angle by moving optical path for collection is prone to generate optical path deviation, and low measurement precision is caused; multiple corrections of optical path causes a reduction of detection efficiency of the product; moreover, the area required for changing detection viewing angles are big, which goes against the miniaturization of the reconstruction system.

The various components of the three-dimensional reconstruction system are described in detail below:

A carrier device 10, the carrier device 10 includes a horizontal translation carrier 14 and a rotatable support 11, the horizontal translation carrier 14 and the rotatable support 11 are preferably electric drive structure. The rotatable support 11 is arranged on the horizontal translation carrier 14, and a rectangular coordinate system is established by taking the direction perpendicular to the horizontal translation carrier 14 as Z-axis direction, the rotational axis 13 at least includes a horizontal rotational axis (i.e., X rotational axis or Y rotational axis), and may further include a vertical rotational axis (i.e., Z rotational axis). The rotatable support 11 may move with the movement of the horizontal translation carrier 14. Particularly, the rotatable support 11 is supported by a supporting seat 15, and the supporting seat 15 is provided with a motor for driving the rotatable support 11 to rotate. The data acquisition device 20 is arranged on a vertical lifting platform 22, the initial direction of the horizontal rotational axis of the rotational axis 13 of the rotatable support 11 is parallel to the horizontal translation carrier 14, if the rotational axis 13 further includes a vertical rotational axis, the initial direction of the vertical rotational axis is perpendicular to the horizontal translation carrier 14. The optical path of the data acquisition device 20 is perpendicular to the horizontal translation carrier 14, the movement of the horizontal translation carrier 14 drives the rotatable support 11 to move in the horizontal direction, such that the object is enabled to be within an acquisition range of the data acquisition device 20, the horizontal translation carrier 14 may also drive the object to move horizontally to complete scanning of the surface of the object. The data acquisition device 20 may move upwards and downwards to enable the height of the data acquisition device 20 relative to the carrier 12 to be adjustable, thereby ensuring that the whole appearances of objects of different sizes and the same object may be collected at different viewing angles. By rotating the rotatable support 11 based on the rotational axis 13, the object is presented in a data acquisition interval of the data acquisition device 20 at different viewing angles, so that the single-visual-angle data of different viewing angles is obtained for subsequent three-dimensional reconstruction.

Furthermore, the carrier device 10 further includes a base 16 and a bracket 17 arranged on the base 16, the horizontal translation carrier 14 is arranged on the base 16, the vertical lifting platform 22 is arranged on the bracket 17. An assembly for performing lifting movement of the vertical lifting platform 22 may be arranged on the bracket 17, and the assembly may specifically be a sliding assembly. Furthermore, except that the assembly may perform a vertical movement, the assembly may also move horizontally on the bracket 17 to drive the vertical lifting platform 22 to move horizontally.

Specifically, in the first embodiment, the horizontal translation carrier 14 includes but is not limited to a X-axis translation carrier 141 and a Y-axis translation carrier 142 stacked with the X-axis translation carrier 141, a support base 15 and the rotatable support 11 are arranged on the X-axis translation carrier 141 (when the X-axis translation carrier 141 is above the Y-axis translation carrier 142) or on the Y-axis translation carrier 142 (when the Y-axis translation carrier 142 is above the X-axis translation carrier 141), the vertical lifting platform 22 is a Z-axis lifting platform, and an initial direction of the rotational axis 13 is parallel to the X-axis direction or the Y-axis direction.

In the second embodiment, the horizontal translation carrier 14 includes the X-axis translation carrier 141 and a Y-axis slideway (not shown) disposed on the X-axis translation carrier 141, the support base 15 is slidably connected with the Y-axis slideway, the vertical lifting platform 22 is also a Z-axis lifting platform, and the initial direction of the rotational axis 13 is parallel to the Y-axis direction or the Y-axis direction.

In the third embodiment, the horizontal translation carrier 14 includes the Y-axis translation carrier 142 and an X-axis slideway (not shown) disposed on the Y-axis translation carrier 142, the support base 15 is slidably connected with the X-axis slideway, the initial direction of the rotational axis 13 is parallel to the Y-axis direction or the X-axis direction, and the vertical lifting platform 22 is also a Z-axis lifting platform.

In the second embodiment and the third embodiment, the X-axis slideway and the Y-axis slideway may be a convex slide rail, and a sliding chute is arranged on the bottom of the support base 15 correspondingly. The X-axis slideway and the Y-axis slideway may also be sliding chute, a convex slide rail is arranged on the bottom of the support base 15 correspondingly. Additionally, the support base 15, the X-axis slide, the Y-axis slide, the X-axis translation carrier 141 or the Y-axis translation carrier 142 are also provided with a locking member configured to fix the support base 15 on a position of the slideway.

Based on the design of the horizontal translation carrier 14 and the vertical lifting platform 22, a Cartesian rectangular coordinate system is established by taking the direction of light source incident direction of the data acquisition device 20 as the Z-axis direction, the horizontal translation carrier 14 may realize linear motion in the X direction and the Y directions, respectively, the object to be measured is fixed on the rotatable support 11, such that linear motion in the X direction and in the Y direction and the rotation around Y-axis and Z-axis may be realized. The aforesaid carrier device 10 has three technical effects as follows: first, it only needs to perform a single-dimensional transformation under this design, the motion trajectory is simple, the speed is high, and the time required for viewing angle transformation is reduced; second, light source and the detected optical path need not to be rotated in this technical solution, the area required for detection is small, so that construction of compact instruments is facilitated; thirdly, rotation information of the rotatable support 11 may be better used for later matching and splicing of multi-view measurement result.

The data acquisition device 20, the data acquisition device 20 includes a camera 21 and the vertical lifting platform 22, the camera 21 is arranged on the vertical lifting platform 22. The reconstruction system may collect single-visual-angle data based on the existing chromatic dispersion confocal method, in particular, the reconstruction system uses broad-spectrum illumination which may be white light, different wavelengths causes different convergence heights, reflection plane height information is obtained by measuring reflection spectrum distribution. In particular, the camera 21 includes at least one broad spectrum light source, one chromatic dispersion lens and one detector, the broad-spectrum light source emits broad-spectrum light, the broad-spectrum light is transmitted through a row of input optical fibers, and forms linear-shaped detection light at the output end of the input optical fiber, the linear-shaped detection light is projected on the surface of the object after penetrating through the chromatic dispersion lens, and is concentrated at different heights of the surface of the object, the line-shaped light reflected by the surface of the object penetrates through the chromatic dispersion lens again and is transmitted over the output optical fibers, and is finally received by the detector, so that the corresponding reflective light data is obtained. Scanning the surface of the object by the detection broad-spectrum light is completed by controlling the object to move horizontally relative to the camera, signals of broad-spectrum light are received by the detector, the reflective light data reflecting the surface topography of the object is obtained, the single-visual-angle data may be obtained by performing corresponding processing on the reflective light data through the data processing device; the single-visual-angle data may be two-dimensional single-visual-angle data or three-dimensional single-visual-angle data. According to this method, the rotatable support 11 is rotated by a corresponding angle, and the above-mentioned process is performed on each angle to obtain data of different viewing angles. The reason for selecting this method is that the steps of multiple illumination or moving and zooming and the like are not required, and this method has the advantages of being simple in the structure and being high in the speed. Additionally, the data acquisition device 20 may move upwards and downwards, when the object rotates to a certain angle, the height position of the data acquisition device 20 may be appropriately adjusted to acquire complete single-visual-angle data. In one embodiment, the detector is a spectrometer configured to obtain the light wavelength with the maximum light intensity by measuring the reflection spectrum data, the spectrometer may obtain surface reflection position of the object to be measured through a calculation formula between the focal depth and the wavelength of confocal chromatic dispersion, the spectrometer further obtains the surface topography of the object to be measured. The detector may also be another detector that may obtain the surface topography of the object to be measured, where the single-visual-angle data is the data representing the surface topography of the object to be measured and obtained by processing the reflective light signal received by the chromatic dispersion lens at the same viewing angle.

The data processing device 30, the data processing device 30 may obtain single-visual-angle data of different viewing angles of an object based on the rotation of the rotatable support 11, and may preferably obtain the single-visual-angle data through a chromatic dispersion confocal method in this embodiment. The data processing device 30 may perform three-dimensional reconstruction according to the single-visual-angle data of different viewing angles and the conversion matrix of different viewing angles. In particular, the data acquired at different viewing angles are integrated into the same three-dimensional coordinate system through the conversion matrix to construct a three-dimensional topography of the object. In this embodiment, a fixed coordinate system (i.e., the Cartesian rectangular coordinate system established by taking the light source incident direction of the data acquisition device 20 as the Z-axis positive direction) of the system may be determined, and multiple single-visual-angle data are integrated into the coordinate system. The concept of the transformation matrix is a well-known concept in the field of mathematics and physics. The transformation matrix defines a correspondence relationship of the same target in different coordinate systems. For example, the original three-dimensional coordinate system is rotated by an angle around the Y-axis which is taken as the rotational axis 13, and a new three-dimensional coordinate system is obtained. A transformation relationship of the original coordinate of a spatial point P in the original three-dimensional coordinate system and the new coordinate of the spatial point P in the new three-dimensional coordinate system corresponds to a conversion matrix, the transformation matrix is established based on the spatial position relationship of the new and old coordinate system.

The reconstruction system in this embodiment performs view-angle transformation on the selected angle through the fixed rotational axis 13, the coordinate transformation may be directly performed on the measurement results of different viewing angles according to the rotational axis 13 and the angular distribution in theory. However, the rotational axis 13 of the instrument is not fixed actually, factors such as the surrounding temperature, the tightness of mechanical fastening, the human touch may change the actual direction or the rotational axis position, therefore, there is big error caused by performing registration and matching of point cloud according to the direction and position distribution of the rotational axis 13 in the instrument design. The temperature fluctuation in continuous detection is small and human touch would not occur substantially, the mechanical fixing has a relatively higher influence, based on the fact that the positioning accuracy and the repetition precision of the rotatable support 11 are relatively high, it is proposed in the present disclosure that, after using for a period of time, direction measurement and position measurement of the rotational axis 13 are performed before detection, a new conversion matrix of all viewing angles is obtained by combining the measured distribution of the rotational axis 13 with the rotating angle set for the rotatable support 11, the transformation matrix is updated after the rotational axis 13 is measured each time, that is, the reconstruction algorithm is corrected, and the accuracy of point cloud data registration of measurement results of different viewing angles is improved. Of course, if a human touch occurs, then, a correction should be made correspondingly.

Figure 3:
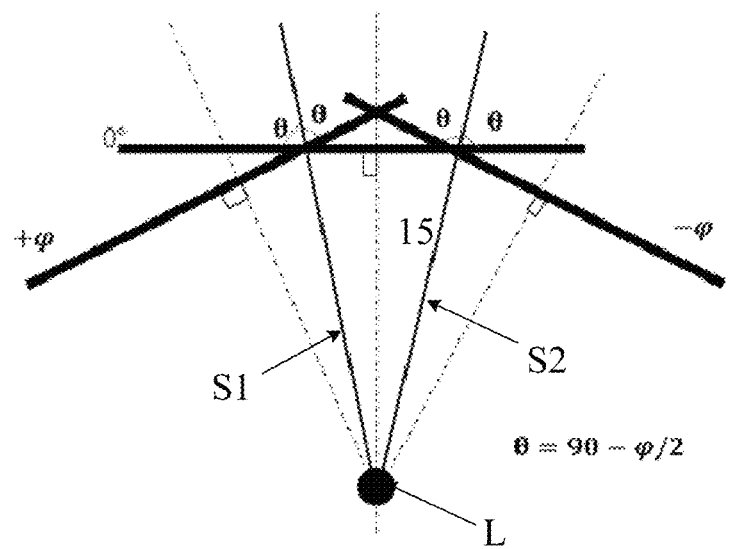
FIG. 3 illustrates a principle diagram of rotational axis of the three-dimensional reconstruction system provided by an embodiment of the present disclosure.
Figure 4:
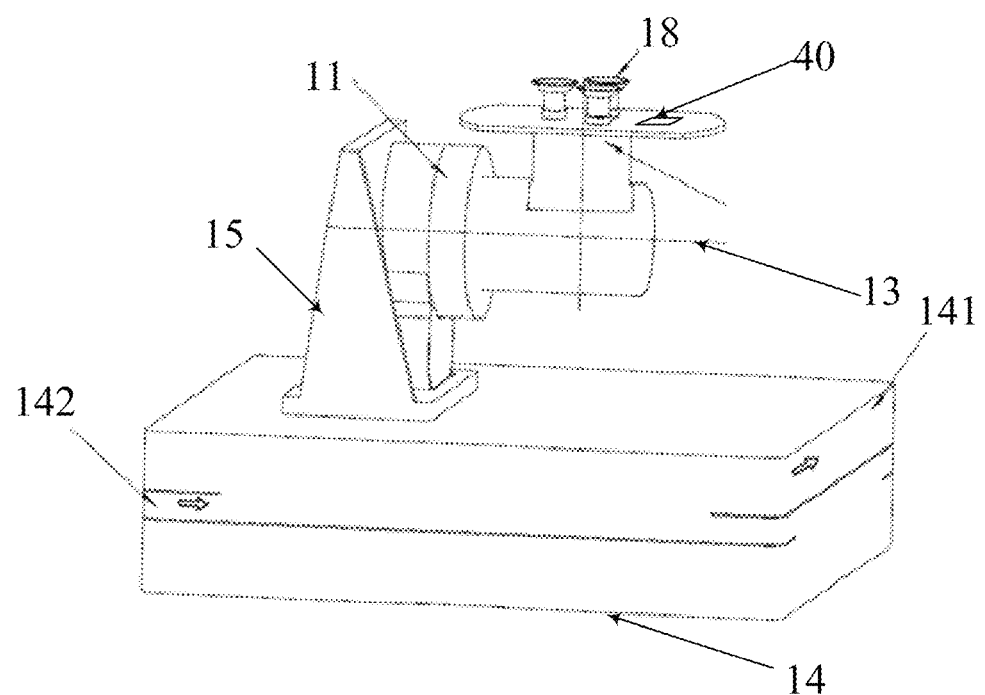
FIG. 4 illustrates a second schematic structural diagram of the carrier device of the three-dimensional reconstruction system provided by an embodiment of the present disclosure.

Correspondingly, referring to FIG. 3 and FIG. 4, the three-dimensional reconstruction system may also be used for measurement of rotational axis. Specifically, this device is provided with a rotational axis correction surface for reflecting the reflective light signal generated by incident light. When the rotational axis 13 is measured, the data acquisition device collects the reflected signal from the rotational axis correction surface to obtain reflection data, calculates the rotational axis position according to the reflection data, and corrects the reconstruction algorithm according to the rotational axis position. The rotational axis correction surface may be fixedly or removably arranged on a corresponding element of the carrier device. In Particular, methods of fixing the rotational axis correction surface include but are not limited to arranging a correction plate on a carrier or a rotational axis to be tested or other component, or directly generating a reflection surface on the carrier or on the rotational axis or on other component by machining (e.g., mechanical friction) or physicochemical processing (e.g., etching or evaporation). The detachable installation manners include but are not limited to connecting the rotational axis correction surface with the corresponding component in the carrier device in the manner of such as snap connection, screw connection, spring connection, sliding connection, adhesion, etc. The setting manners and the setting the rotational axis position correction surface herein include but are not limited to the manners listed in the embodiments. Preferably, the rotational axis correction surface is a diffuse reflection surface 40 arranged on the carrier 12 and is configured to drive the rotatable support 11 to rotate, the reflected signal reflected by the diffuse reflection surface 40 is collected by the data acquisition device 20, the diffuse reflection data is analyzed by the data processing device 30, the rotational axis position is calculated, and the reconstruction algorithm is corrected using position data of the rotational axis. This section of contents will be described more detailedly in the subsequent sections.

After the reconstruction system is used for a period of time, the rotational axis 13 is inevitably deviated, the accuracy of the three-dimensional reconstruction may be ensured according to the measurement of the rotational axis and the correction of the reconstruction algorithm. Moreover, the deviation of the rotational axis 13 occurs with the increasing of use time, and the measurement of the rotational axis 13 need not to be performed in each detection, the deviation of optical path may be easily avoided based on high positioning accuracy of the rotational axis 13 and the manner that the optical path for collection is stable and the object rotates, and the system may further improve the detection efficiency.

Figure 5:
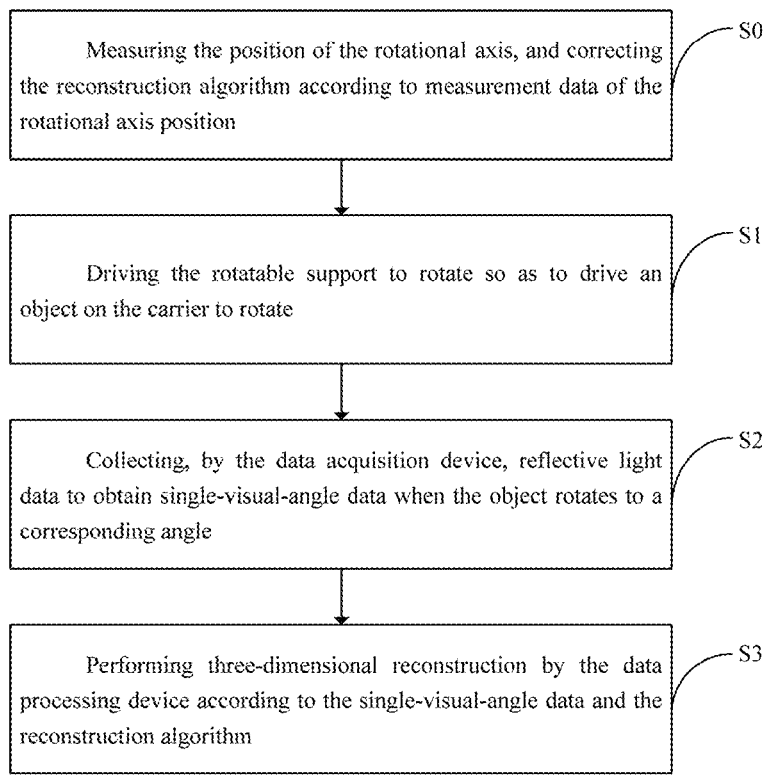
FIG. 5 illustrates a flowchart of a three-dimensional reconstruction method provided by an embodiment of the present disclosure.

The embodiments of the present disclosure further provide a three-dimensional reconstruction method which is performed based on the three-dimensional reconstruction system. As shown in FIG. 5, the three-dimensional reconstruction method includes the following steps:

in a step of S1, driving an object on a carrier 12 to rotate through rotation of a rotatable support 11;

in a step of S2, collecting, by a data acquisition device 20, reflective light data when the object rotates to a corresponding angle so as to obtain single-visual-angle data;

in as step of S3, performing three-dimensional reconstruction by the data processing device 30 according to the single-visual-angle data and a reconstruction algorithm.

In these steps mentioned above, the rotatable support 11 of the carrier device 10 rotates based on its rotational axis 13, the rotation of the rotatable support 11 may be specifically one-dimensional rotation (rotating about X-axis or Y-axis) or two-dimensional rotation (rotating about the X-axis or the Y-axis and the Z-axis), the camera 21 of the data acquisition device 20 is spaced apart from the carrier 12 for a certain distance, and the optical path for collection of the camera 21 is preferably perpendicular to the initial direction of the rotational axis 13. The object is driven to rotate by the rotational axis 13, when the object rotates to the corresponding angle, the data acquisition device 20 acquires single-visual-angle data at the corresponding angle, multiple single-visual-angle data is transmitted to the data processing device 30 and is processed by the data processing device 30, so that the three-dimensional reconstructed image of the object is obtained.

Particularly, regarding the arrangement of the rotatable support 11, reference can be made to the design of three-axis (X-axis, Y-axis and Z-axis) translation carrier device 10 of the three-dimensional reconstruction system. Based on the aforesaid carrier device 10, a Cartesian rectangular coordinate system is established by taking the light source incident direction of the data acquisition device 20 as the Z-axis positive direction, the horizontal translation carrier 14 may realize linear motion in the X and Y directions respectively, and the object to be measured is fastened on the rotatable support 11 to realize linear motion in the X-axis direction and Y-axis direction and the rotation around the X-axis or Y-axis and Z-axis, the object rotates around the X-axis or the Y-axis to obtain multiple single-visual-angle data. In data acquisition process, the horizontal position of the rotatable support 11 may be moved, so that the height of the data acquisition device 20 is adjusted, and high quality data is obtained.

Furthermore, in the aforesaid step S2, in particular, single-view three-dimensional data of the object at different viewing angles is collected by irradiating the object with a broad-spectrum light source based on the chromatic dispersion confocal method, regarding the detailed process, reference can be made to the descriptions set forth above, the detailed process is not repeatedly described here. Regarding the advantages of the method, reference can be made to the descriptions set forth above, the advantages of the method are not repeatedly described here.

Furthermore, the step S3 specifically includes: applying single-visual-angle data of different viewing angles to a preset conversion matrix of corresponding viewing angle through the data processing device 30, and performing three-dimensional data point cloud registration so as to obtain a three-dimensional reconstructed image. This step specifically refers to integrating data acquired from different viewing angles into the same three-dimensional coordinate system to construct a three-dimensional morphology of the object through conversion matrix. Specifically, in this embodiment, a plurality of single-visual-angle data are spliced and constructed, and the three-dimensional image of the object is generated in the Cartesian rectangular coordinate system.

Furthermore, since the rotational axis position is affected by different factors including temperature and working environment, in order to ensure the accuracy of measurement data, the rotational axis position needs to be corrected for a period of time or when a person touches the surrounding of the rotational axis 13. Based on the fact that the rotatable support 11 has higher positioning accuracy and repetition accuracy, it is proposed in the embodiment of the present disclosure that the rotational axis 13 is corrected when the deviation of the rotational axis 13 is greater than or equal to the preset deviation after a period of time, that is, the direction and the rotational axis position are measured before detection, new conversion matrix of all viewing angles is obtained by combining the measured distribution of the rotational axis 13 with the rotating angle set by the rotatable support 11, the conversion matrix is updated after each measurement of the rotational axis 13, the reconstruction algorithm is corrected, and the accuracy of cloud data splicing of measurement results of different viewing angles is improved. That is, a step S0 of measuring the rotational axis position of the rotatable support 11 and correcting the reconstruction algorithm according to measurement data of the rotational axis position is included before step S1.

As shown in FIG. 6, in particular, step S0 includes: measuring the rotational axis position of the rotatable support, and correcting the reconstruction algorithm according to the measurement data of the rotational axis position.

Step S0 includes:

arranging a diffuse reflection surface on the carrier;

enabling the diffuse reflection surface on the rotatable support to rotate by a first angle and by a second angle sequentially based on the current position, obtaining the initial position data of the diffuse reflection surface without rotation in the initial coordinate system of the system, and obtaining the first angular data at the first angle and the second angular data at the second angle; and calculating the rotational axis position according to the first angular data, the second angular data, and the initial position data;

In a step of S01, disposing a diffuse reflection surface 40 on the carrier 12;

In a step of S02, enabling the diffuse reflection surface 40 on the rotatable support 11 to rotate by the first angle and rotate by the second angle sequentially based on the current position;

Preferably, the first angle and the second angle are identical in angular dimension and opposite in direction, in other embodiments, the first angle and the second angle may not be identical; as shown in FIG. 3, the current position corresponds to angle of 0 degree, the first angle and the second angle are $+\varphi$ and $-\varphi$, respectively.

In a step of S03, obtaining the initial position data of the diffuse reflection surface 40 without rotation in the initial coordinate system of the system, the first angular data at the first angle and the second angular data at the second angle;

Step S04, calculating the rotational axis position according to the first angular data, the second angular data and the initial position data;

Preferably, the initial plane corresponding to the initial position data and the first angular bisector plane S1 of the first plane corresponding to the first angular data are calculated, the second angular bisector plane S2 of the second plane corresponding to the initial plane and the second angular data is calculated, and an intersection line L of the first angular bisector plane S1 and the second angular bisector plane S2 is determined as the rotational axis position.

In a step of S05, incorporating the rotational axis position into an uncorrected reconstruction algorithm to generate a corrected reconstruction algorithm.

In this embodiment, the reason of using the diffuse reflection surface 40 is that: firstly, height distribution is uniform, calculation errors of the first plane and the second plane and the initial plane are small; secondly, if a plane mirror is used as a rotational axis correction component, due to limitation of numerical aperture of optical path for collection, signal light will be reflected at a larger angle and cannot reach the detector when the rotation angle is larger; however, generally speaking, the detected sample may be tilted and detected only when it rotates at a large angle. According to the test, the diffuse reflection surface 40 (e.g., frosted glass) is used as a rotational axis test component, even if incident light is parallel light, a reflective light angle of the diffuse reflection surface reflects Gaussian distribution, at this time, even if the rotation angle of the sample exceeds a numerical aperture of the optical system, there is still part of light reaching the detector of the data acquisition device 20, thereby ensuring that the diffuse reflection surface distribution may be successfully detected.

The diffuse reflection surface 40 is mounted close to the object to be measured on the carrier 12 of the rotatable support 11. When the rotational axis 13 needs to be measured, the horizontal translation carrier 14 is moved, so that light is irradiated on the diffuse reflection surface 40 to be measured. The diffuse reflection surface 40 may also be arranged in other manners such as adsorbing the diffuse reflection surface 40 on a vacuum chuck, and so on.

The use of the diffuse reflection surface 40 effectively increases rotation angle range of the rotational axis measurement standard element. For example, an optical system uses a reflection mirror as a rotational axis correction standard element, the rotation angle range is within ±15°, after the diffuse reflection surface 40 is used as the rotational axis correction standard element, the rotation angle range is increased to be within ±45°. Theoretically, the object to be measured in the chromatic dispersion confocal optical system is usually non-specular and may accept reflective light with larger angle to achieve measurement within larger range. It needs to be particularly noted that, although there is no direct correspondence relationship between rotation angle value and the rotational axis position theoretically, actually, after multiple measurements, it is found that the detection accuracy is much higher after the rotational axis position which is obtained using larger rotation angle (greater than 15°, preferably between 30° and 45°, such as 30°, 35°, 40°, 45°, etc.) and is corrected using the algorithm.

Based on the three-axis (i.e., X-axis, Y-axis and Z-axis) moving platform, and the structure that the rotational axis 13 of the rotatable support 11 is parallel to the Y-axis direction, a specific rotational axis measuring method is provided.

Referring to FIG. 3, when the rotational axis 13 is not rotated, the rotation angle of the rotational axis 13 is defined as 0 degree, when the rotational axis 13 rotates by a first angle in a forward direction, the rotation angle of the rotational axis 13 is defined as $+\varphi$, when the rotational axis 13 rotates by a second angle in a backward direction, the rotation angle of the rotational axis 13 is defined as $-\varphi$.

In the first step, moving the X-axis translation carrier 141 and the Y-axis translation carrier 142, the light is irradiated on the diffuse reflection surface 40, scanning the diffuse reflection surface 40 when the rotation angle of the rotational axis 13 of the rotatable support is 0, and obtaining a surface matrix in the array of M×N points.

Light ray penetrating through the chromatic dispersion lens and irradiated on the surface of the object is a dot matrix arranged in line, M is the number of spots of incident light, N represents the number of collection times when the light ray is scanned along the surface of the object, when the position of a spot in the initial coordinate system is (x, y, z), the 0° line in FIG. 3 represents 0° diffuse reflection surface (initial plane) which is represented by M×N points.

In the second step, the rotational axis 13 rotates the first angle of $+\varphi$, the position of the light spot (x, y, z) becomes $(x_1, y_1, z_1)$, line $\varphi$ in FIG. 3 represents the diffuse reflection surface (i.e., the first plane) formed by M×N (x1, y1, z1) points, coordinates $(x_1, y_1)$ represent the positions converted according to the rotation angle of the rotational axis 13 after the coordinate (x, y) rotates by the first angle of $+\varphi$.

In the third step, after the rotational axis 13 rotates by the second angle of $-\varphi$, and the 0° diffuse reflection surface rotates by the second angle of $-\varphi$, the position of the spot (x, y, z) becomes $(x_2, y_2, z_2)$, line $-\varphi$ in FIG. 3 represents the position of the diffuse reflection surface (i.e., the second plane) formed by the M×N points $(x_2, y_2, z_2)$, the coordinate $(x_2, y_2)$ represents the position obtained by converting according to the angle of the axis of rotation 13 after the coordinate (x, y) rotates by the second angle of $-\varphi$.

In the measurement, the rotation angle of the rotational axis is equal to 35°.

Where x, y is the position of x and y in the initial three-dimensional coordinate system, x1, y1, and x2, y2 are also positions in the initial three-dimensional coordinate system, z, z1, z2 are Z-axis height information of the diffuse reflection surface measured by the chromatic dispersion confocal data acquisition device 20. The first angular bisector plane S1 of the initial plane and the first plane, the second angular bisector plane S2 of the initial plane and the second plane are calculated respectively according to dot matrix of the initial plane, the first plane and the second plane, and the intersection line L of the two angular bisector planes is the rotational axis 13, the black dot in FIG. 3 represents the rotational axis 13, the rotational axis 13 is a line perpendicular to paper surface, the information of the rotational axis 13 is a direction vector which represents the position and the direction of the rotational axis 13 in the three-dimensional coordinate system initially arranged by the system. In data splicing process, the corrected transformation matrix of different viewing angles may be obtained directly according to the rotational axis position measured above in combination with the rotation angles of the rotatable support 11 at different viewing angles, so that accurate splicing is further achieved.

As described above, in the three-dimensional reconstruction system and three-dimensional reconstruction method provided by the embodiments of the present disclosure, the detected optical path is invariable, the object is rotated, three-dimensional reconstruction is performed in combination with the transformation matrix, so that the detection accuracy and the detection efficiency are improved; the algorithm is corrected by detecting the rotational axis position periodically, so that the detection precision and the detection efficiency are further improved; the diffuse reflection surface 40 is used as a rotational axis correction standard element, the reflection angle is large, the detection optical signal reflected by the object is ensured to be received by the detection lens; moreover, the correction effect is much better when the rotation angle is larger; the detection is simplified and much easier to be realized according to the design of the horizontal translation carrier 14 and the vertical lifting platform 22.

The foregoing are only preferred embodiments of the present disclosure, and should not be regarded as limitation to the present disclosure. Any modification, equivalent replacement, improvement, and the like, which are made within the spirit and the principle of the present disclosure, should all be included in the protection scope of the present disclosure.

What is claimed is:

1. A three-dimensional reconstruction system, comprising:
    a carrier device which comprises a rotatable support and a carrier arranged on the rotatable support, the rotatable support comprises a rotational axis;
    a data acquisition device spaced apart from the carrier and configured to collect reflective light data of an object on the carrier when the rotatable support rotates to a corresponding angle so as to obtain single-visual-angle data of the object at the corresponding angle; and
    a data processing device connected with the data acquisition device and configured to perform three-dimensional reconstruction according to the single-visual-angle data and a reconstruction algorithm;
    wherein the three-dimensional reconstruction system further comprises a rotational axis correction surface, the data acquisition device is further configured to collect reflection signals of the rotational axis correction surface so as to obtain reflection data; and the data processing device is further configured to correct the reconstruction algorithm according to the reflection data.

2. The three-dimensional reconstruction system according to claim 1, wherein the data acquisition device is a chromatic dispersion confocal data acquisition device, and the collected reflective light data is reflection spectrum data.

3. The three-dimensional reconstruction system according to claim 1, the data processing device is further configured to calculate a rotational axis position according to the reflection data and correct the reconstruction algorithm according to the rotational axis position.

4. The three-dimensional reconstruction system of claim 1, wherein the rotational axis correction surface is arranged on the carrier.

5. The three-dimensional reconstruction system according to claim 1, wherein the rotational axis correction surface is a diffuse reflection surface.

6. The three-dimensional reconstruction system of claim 1, wherein an initial direction of the rotational axis is perpendicular to an optical path for collection of the data acquisition device.

7. The three-dimensional reconstruction system according to claim 6, wherein the carrier device further comprises a horizontal translation carrier, the data acquisition device comprises a vertical lifting platform and a camera arranged on the vertical lifting platform;
    the rotatable support is arranged on the horizontal translation carrier;
    the data acquisition device is arranged on the vertical lifting platform to enable a height of the data acquisition device relative to the carrier to be adjustable;
    an initial direction of the rotational axis is parallel to the horizontal translation carrier;
    an optical path for collection of the data acquisition device is perpendicular to the horizontal translation carrier.

8. The three-dimensional reconstruction system according to claim 7, wherein the camera at least comprises a broad-spectrum light source, a chromatic dispersion lens and a detector, the broad-spectrum light source, the chromatic dispersion lens and the detector are configured to obtain the single-visual-angle data based on a chromatic dispersion confocal method; the data processing device performs the three-dimensional reconstruction according to the single-visual-angle data of different viewing angles and a conversion matrix of different viewing angles.

9. A three-dimensional reconstruction method performed based on the three-dimensional reconstruction system according to claim 1, comprising steps of:
    S1, driving the rotatable support to rotate so as to drive an object on the carrier to rotate;
    S2, collecting reflective light data to obtain single-visual-angle data by the data acquisition device when the object rotates to a corresponding angle; and
    S3, performing three-dimensional reconstruction by the data processing device according to the single-visual-angle data of different angles and the reconstruction algorithm;
    wherein the three-dimensional reconstruction method further comprises a step S0 of measuring the rotational axis position of the rotatable support and correcting the reconstruction algorithm according to measurement data of the rotational axis position before the step S1.

10. The three-dimensional reconstruction method according to claim 9, wherein the step S2 specifically comprises:
    irradiating the object with a broad-spectrum light source and collecting single-visual-angle data of the object at different viewing angles based on a chromatic dispersion confocal method.

11. The three-dimensional reconstruction method according to claim 10, wherein the chromatic dispersion confocal method at least comprises following steps:
    irradiating broad-spectrum light beam through a broad-spectrum light source and generating linear-shaped detection light;
    projecting the detection light on a surface of the object through a chromatic dispersion lens;
    moving the object horizontally to complete a surface scanning of the object; and
    collecting reflective light data of the detection light which penetrates through the object and is reflected by the object by a detector, and processing the reflective light data to obtain the single-visual-angle data.

12. The three-dimensional reconstruction method according to claim 9, wherein the step S3 specifically comprises: applying single-visual-angle data of different viewing angles to preset conversion matrixes of corresponding viewing angles and performing three-dimensional data point cloud registration to obtain a three-dimensional reconstructed image through the data processing device.

13. The three-dimensional reconstruction method according to claim 9, wherein the step S0 comprises:
    arranging a rotational axis correction surface in a three-dimensional measurement system;
    rotating the rotational axis on the rotatable support by a first angle and by a second angle successively based on its current position, and obtaining initial position data of the rotational axis correction surface without rotation, first angular data of the rotational axis correction surface at a first angle, and second angular data of the rotational axis correction surface at a second angle in an initial coordinate system of the system;

calculating the rotational axis position according to the first angular data, the second angular data and the initial position data; and incorporating the rotational axis position into an uncorrected reconstruction algorithm to generate a corrected reconstruction algorithm.

14. The three-dimensional reconstruction method according to claim 13, wherein the step of calculating the rotational axis position according to the first angular data, the second angular data and the initial position data specifically comprises:

calculating a first angular bisector plane of an initial plane and a first plane, calculating a second angular bisector plane of an initial plane and a second plane; wherein the initial plane corresponds to the initial position data, the first plane corresponds to the first angular data, the second plane corresponds to the second angular data;

determining an intersection line of the first angular bisector plane and the second angular bisector plane as the rotational axis position.

15. The three-dimensional reconstruction method of claim 14, wherein the first angle and the second angle are identical in angular dimension and are opposite in direction in the step S0.

16. The three-dimensional reconstruction method according to claim 13, wherein the rotational axis correction surface is a diffuse reflection surface.

17. The three-dimensional reconstruction method according to claim 16, wherein both the first angle and the second angle are greater than 15 degrees, and the step S0 is performed in the event that an angular deflection of the rotational axis is greater than or equal to a preset angular deflection.

* * * * *